US009936650B2

(12) United States Patent
Palmieri, Jr.

(10) Patent No.: US 9,936,650 B2
(45) Date of Patent: Apr. 10, 2018

(54) SECURE AND EXTERNALLY CONTROLLABLE GROWING ENCLOSURE

(71) Applicant: Podgrow, LLC, Bridgeport, CT (US)

(72) Inventor: Joseph A. Palmieri, Jr., Bridgeport, CT (US)

(73) Assignee: Podgrow, LLC, Bridgeport, CT (US)

( * ) Notice: Subject to any disclaimer, the term of this patent is extended or adjusted under 35 U.S.C. 154(b) by 263 days.

(21) Appl. No.: 14/659,772

(22) Filed: Mar. 17, 2015

(65) Prior Publication Data

US 2016/0066516 A1    Mar. 10, 2016

Related U.S. Application Data

(63) Continuation-in-part of application No. 14/481,756, filed on Sep. 9, 2014.

(51) Int. Cl.
*A01G 9/24* (2006.01)
*A01G 7/04* (2006.01)

(52) U.S. Cl.
CPC .............. *A01G 9/24* (2013.01); *A01G 7/045* (2013.01); *A01G 9/246* (2013.01); *Y02P 60/146* (2015.11)

(58) Field of Classification Search
CPC .................................. A01G 9/14; A01G 7/045
See application file for complete search history.

(56) References Cited

U.S. PATENT DOCUMENTS

| | | | | |
|---|---|---|---|---|
| 2,928,211 A * | 3/1960 | Martinan | ............... | A01G 31/06 47/60 |
| 3,381,409 A | 5/1968 | Lamont | | |
| 3,434,530 A * | 3/1969 | Davis | ........................ | F24F 3/14 165/122 |
| 3,624,380 A * | 11/1971 | Davis | ..................... | A01G 7/045 165/108 |
| 4,989,620 A * | 2/1991 | Keritsis | .................. | A24B 15/14 131/354 |
| 6,132,762 A | 10/2000 | Cristobal | | |
| 7,472,513 B2 | 1/2009 | Bula | | |
| 8,034,843 B2 | 10/2011 | Whittle et al. | | |
| 8,234,812 B1 * | 8/2012 | Colless | ..................... | A01G 9/16 47/61 |
| 8,468,741 B2 * | 6/2013 | Lewis | ...................... | A01G 9/00 47/17 |
| 8,898,954 B2 * | 12/2014 | Wang | ...................... | A01G 9/14 47/17 |
| 9,101,096 B1 * | 8/2015 | Lewis | ...................... | A01G 9/14 |
| 9,288,948 B2 * | 3/2016 | McNamara | ............. | A01G 9/16 |
| 2005/0178058 A1 * | 8/2005 | Rudolph | .................. | A01G 9/16 47/60 |

(Continued)

*Primary Examiner* — Kristen C Hayes
(74) *Attorney, Agent, or Firm* — Wiggin and Dana LLP; Gregory S. Rosenblatt; Jonathan D. Hall (57) ABSTRACT

A securable enclosure for growing controlled plants including walls forming an environmentally isolated interior and securable entrance to prevent unauthorized access. An environmental control system regulates environmental conditions in the enclosure's interior in order to control levels of potential contaminants such as dust, mold, pollen, insects and chemical pollutants. A control unit is positioned on the exterior of the enclosure allows control of the environmental conditions without the need for physical access to the interior.

5 Claims, 8 Drawing Sheets

(56) References Cited

U.S. PATENT DOCUMENTS

| | | | |
|---|---|---|---|
| 2006/0016125 A1* | 1/2006 | Krauss | A01G 7/045 47/58.1 R |
| 2009/0025287 A1* | 1/2009 | Lee | A01G 7/00 47/17 |
| 2011/0232186 A1* | 9/2011 | Lewis | A01G 9/00 47/66.6 |
| 2012/0210640 A1* | 8/2012 | Ivanovic | A01G 9/24 47/58.1 LS |
| 2012/0287617 A1* | 11/2012 | Mekhtarian | A01G 7/045 362/228 |
| 2014/0020292 A1* | 1/2014 | McNamara | A01G 9/16 47/66.6 |
| 2014/0115958 A1* | 5/2014 | Helene | A01G 1/001 47/17 |
| 2016/0066516 A1* | 3/2016 | Palmieri, Jr. | A01G 9/24 47/17 |
| 2016/0192601 A1* | 7/2016 | Kao | A01G 9/246 47/17 |
| 2016/0324077 A1* | 11/2016 | Frantzen | A01G 9/14 |

\* cited by examiner

SECURE AND EXTERNALLY CONTROLLABLE GROWING ENCLOSURE

CROSS REFERENCE TO RELATED APPLICATION

This application is a Continuation-in-Part of U.S. patent application Ser. No. 14/481,756, entitled "Secure and Externally Controllable Growing Enclosure" and filed Sep. 9, 2014. The contents of U.S. Ser. No. 14/481,756 are hereby incorporated by reference herein in their entirety.

FIELD OF THE DISCLOSURE

The subject matter of the present disclosure generally relates to processing plants of a controlled nature, and more particularly relates to secure, externally controlled processing enclosures.

BACKGROUND OF THE DISCLOSURE

The growing and processing of medicinal and other controlled plants presents certain challenges. Many of these challenges are particularly acute in the growing of commercial-grade marijuana for markets allowing medical or recreational use of marijuana and marijuana-derived products. While the growing of marijuana outside and in custom grow houses has been widely known, commercialized markets present hazards not previously encountered. For the purposes of the present disclosure, controlled plants should be understood to refer broadly to plants subject to government regulation or other specialized control, regardless of the exact nature, efficacy or utility of the resultant plant or plant-product. Often, controlled plants have a higher monetary value per unit weight than produce and many other plants, which creates a unique set of challenging conditions.

Many jurisdictions allowing for commercial production of marijuana have in place onerous regulatory schemes with myriad requirements that producers must adhere to gain or retain proper licensing. These regulatory schemes often include such things as stringent quality control standards. Also, many regulatory schemes, and business plans from a safety and profitability standpoint, require significant security measures to prevent unauthorized access to marijuana plants during the entirety of the plant's growing and processing into product. For many commercial operations compliance with such regulations can be a significant and sometimes insurmountable financial and technical burden.

Maintaining proper growing and processing conditions while growing and processing such plants can present certain difficulties. If environmental conditions such as air quality and humidity are not properly controlled, plant yield and quality can suffer significantly. In stringently regulated markets, quality problems may render certain operations unviable. For instance, many marijuana growing operations suffer from unacceptable levels of pathogens such as black mold, brown rot, grey mold, penicillium mold, rhizopus rot, colletotrichum rot, snow mold and mucor mold.

The trend towards greater social acceptance of marijuana and the accompanying trend of marijuana decriminalization only make more pressing and substantial the problems outlined above.

The subject matter of the present disclosure is directed to overcoming, or at least reducing the effects of, one or more of the problems set forth above.

BRIEF SUMMARY OF THE DISCLOSURE

Disclosed is a system for and method of operating a processing enclosure for controlled plants. In an exemplary embodiment, an enclosure is used to secure early stage plants or for preparing plant product. An environmental control system provides environmental conditions suited to the particular operations being undertaken. This system is operated from outside of the enclosure through the use of an external control unit, thereby reducing the need for access by persons to plants or plant product.

Units may be colloquially referred to as 'pods.' The disclosed pods have several advantages over existing systems. Security is provided for plants and plant product and is more easily maintained by operation of the system from the exterior of a secured enclosure. Environmental conditions can be consistently maintained to prevent mold growth and other contaminations from reducing product yield or quality. These aspects also allow growers to maintain a plant product production operation within strict regulatory parameters.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

Like reference numbers and designations in the various drawings indicate like elements.

DETAILED DESCRIPTION

Disclosed is a securable enclosure and environment suitable for the nurturing and processing of controlled plant products. Depending on the desired configuration, the enclosure can serve as an area for flowering or plant nursery operations, or for drying or processing mature plants in order to produce final plant product.

Figure 1A:
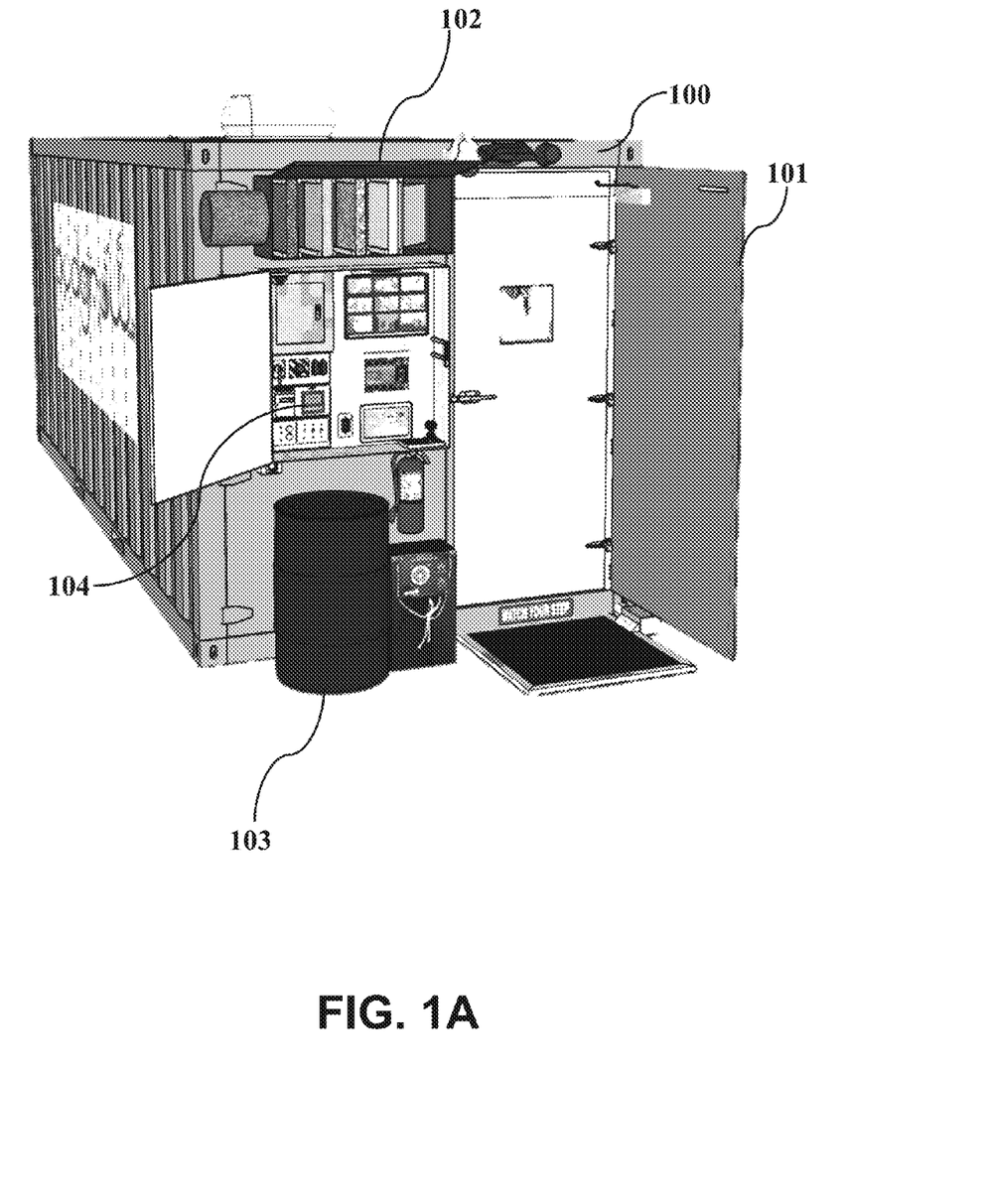
FIG. 1A is a perspective view of the exterior of an embodiment enclosure.
Figure 1B:
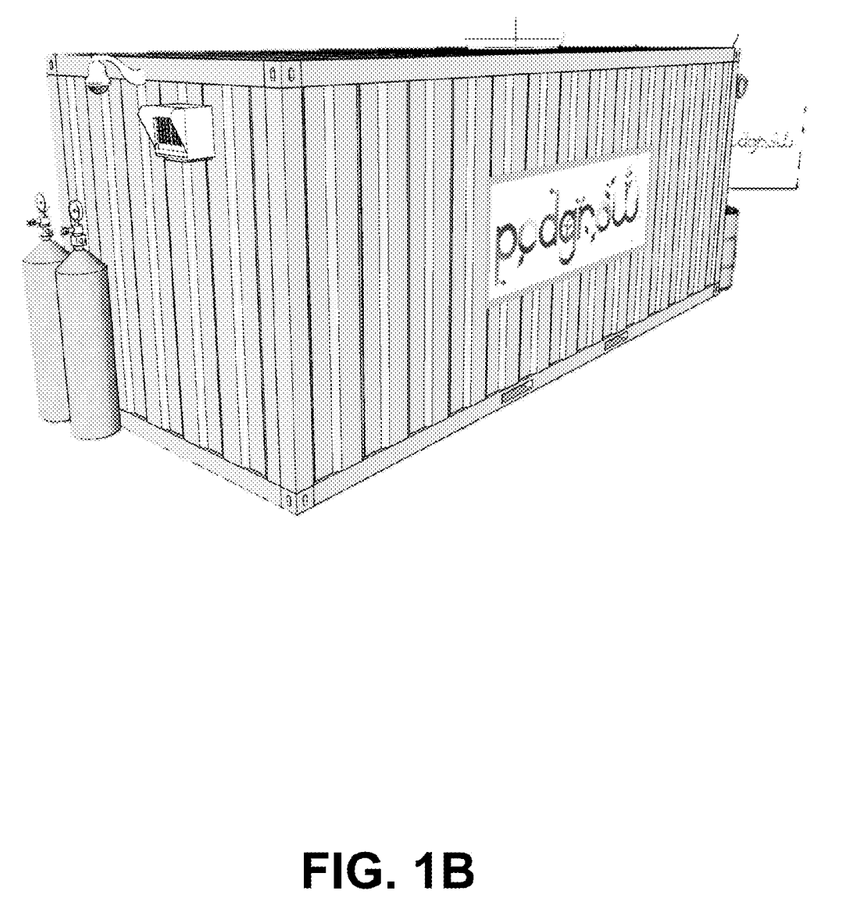
FIG. 1B is another perspective view of the exterior of the embodiment enclosure of FIG. 1A.

FIG. 1A depicts the exterior of embodiment enclosure 100. Securable door 101 provides a means of sealing enclosure 100 and also a means to control access to enclosure 100 to, for instance, prevent unauthorized individuals from obtaining plants or product contained in enclosure 100. Air filtration unit 102 forms part of an overall environmental control system that monitors and controls environmental conditions in enclosure 100. In some embodiments, a hydration reserve 103 contains water or other liquids for nurturing plants. Control unit 104 provides a set of controls to monitor enclosure 100 and conditions in the enclosure's interior. Control unit 104 can also facilitate access monitoring and control of enclosure 100. As control unit 104 is on the exterior of enclosure 100, these functions can be performed without personnel having physical access to enclosure 100. Security of enclosure 100 is thus enhanced.

Figure 2:
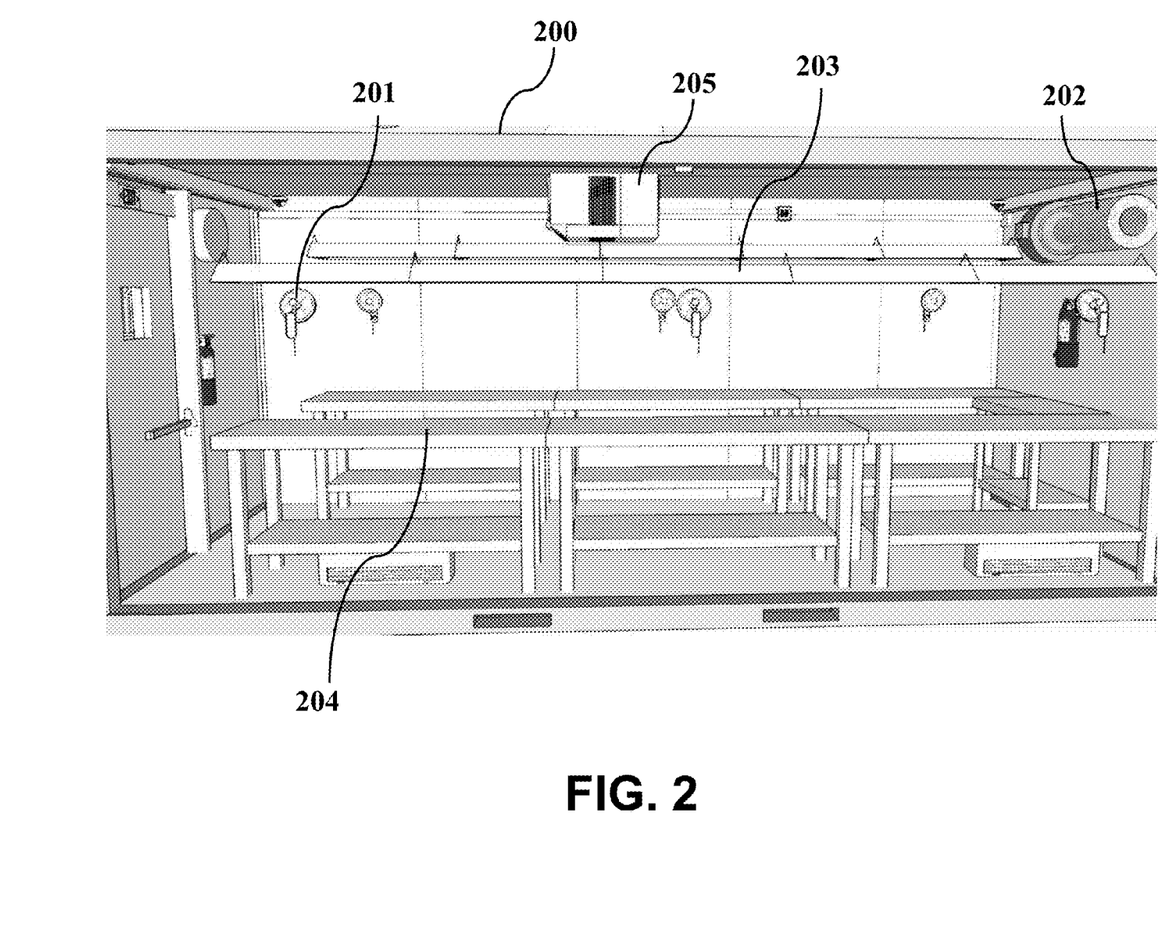
FIG. 2 is a cutaway perspective view of the interior of an embodiment enclosure serving as a nursery pod.

FIG. 2 depicts a side cutaway view of an embodiment enclosure that serves as nursery pod 200. Fans 201 provide circulation of the ambient air in nursery pod 200. An environmental control system (not pictured) maintains consistent environmental conditions that facilitate the growing of early-stage controlled plants in nursery pod 200. An air filtration system (not pictured) is provided as part of an environmental control system, that takes air from the exterior of nursery pod 200 and provides it to the interior of the enclosure, preferably processing the air to facilitate plant growth, such as by removing contaminants such as mold and undesired chemicals. Air outlet 202 allows air to leave nursery pod 200. When processed air is supplied by the air filtration system, a positive pressure may be maintained in nursery pod 200, preventing unprocessed and/or unfiltered air from entering nursery pod 200 through air outlet 202. Insulation paneling may optionally be installed within the walls of nursery pod 200 to allows for easier thermal management of environmental conditions within nursery pod 200. Lighting system 203 provides sufficient light to the plants being grown, preferably using light emitting diode (LED) or other technology that does not produce undesirable amounts of waste heat. Tables 204 provide a surface on which nursery-stage plants may be grown. Dehumidifier 205 serves to remove moisture from the air in the enclosure, helping to combat mold and other contaminants.

Figure 3:
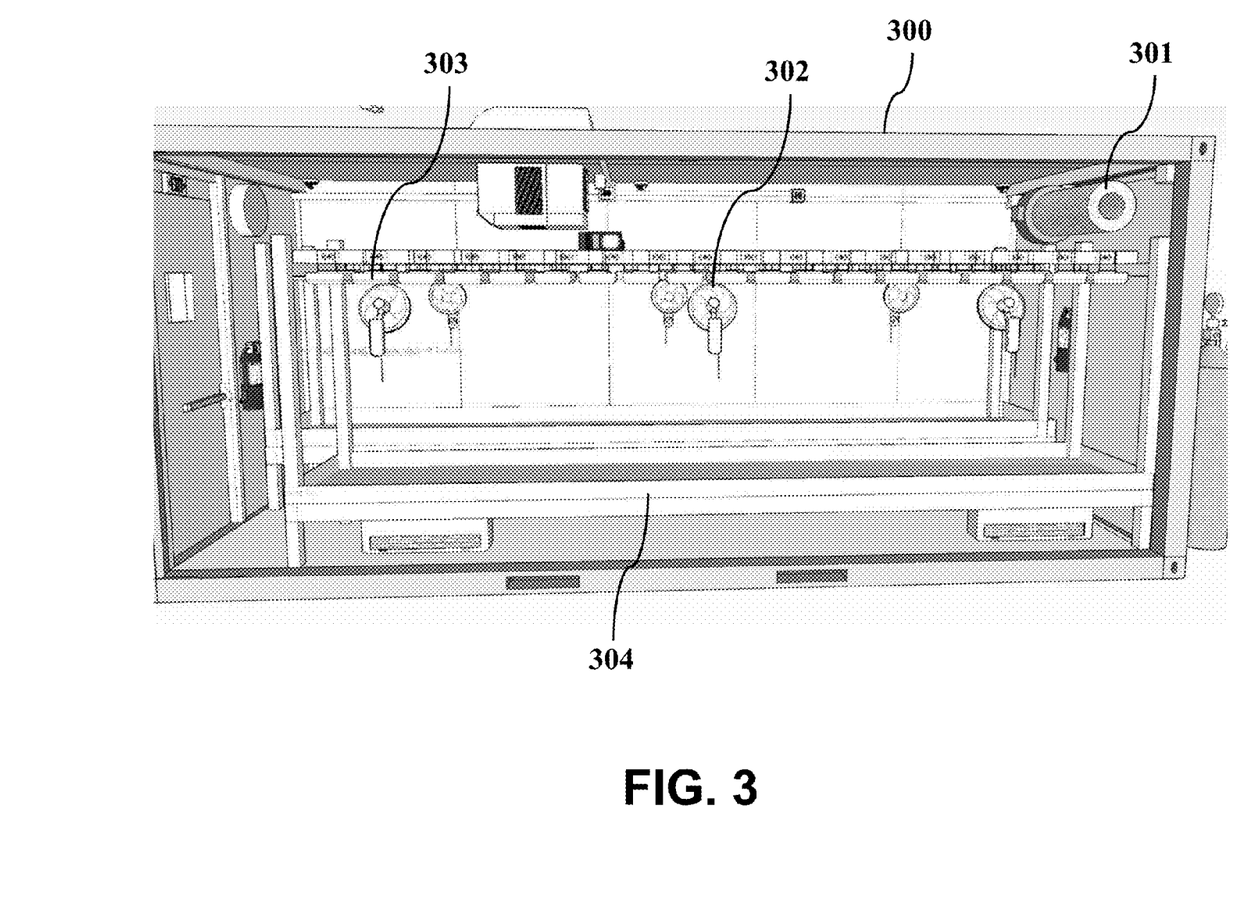
FIG. 3 is a cutaway perspective view of the interior of an embodiment enclosure serving as a flowering pod.

FIG. 3 depicts a side cutaway view of flowering pod 300, which is configured to support flowering of product-producing plants. Similar to nursery pod 200, flowering pod 300 contains an environmental control system (not pictured) that maintains favorable environmental conditions within flowering pod 300, air outlet 301, fans 302 and lighting 303. Shelving 304 provides an area on which product-producing plants may flower.

Figure 4:
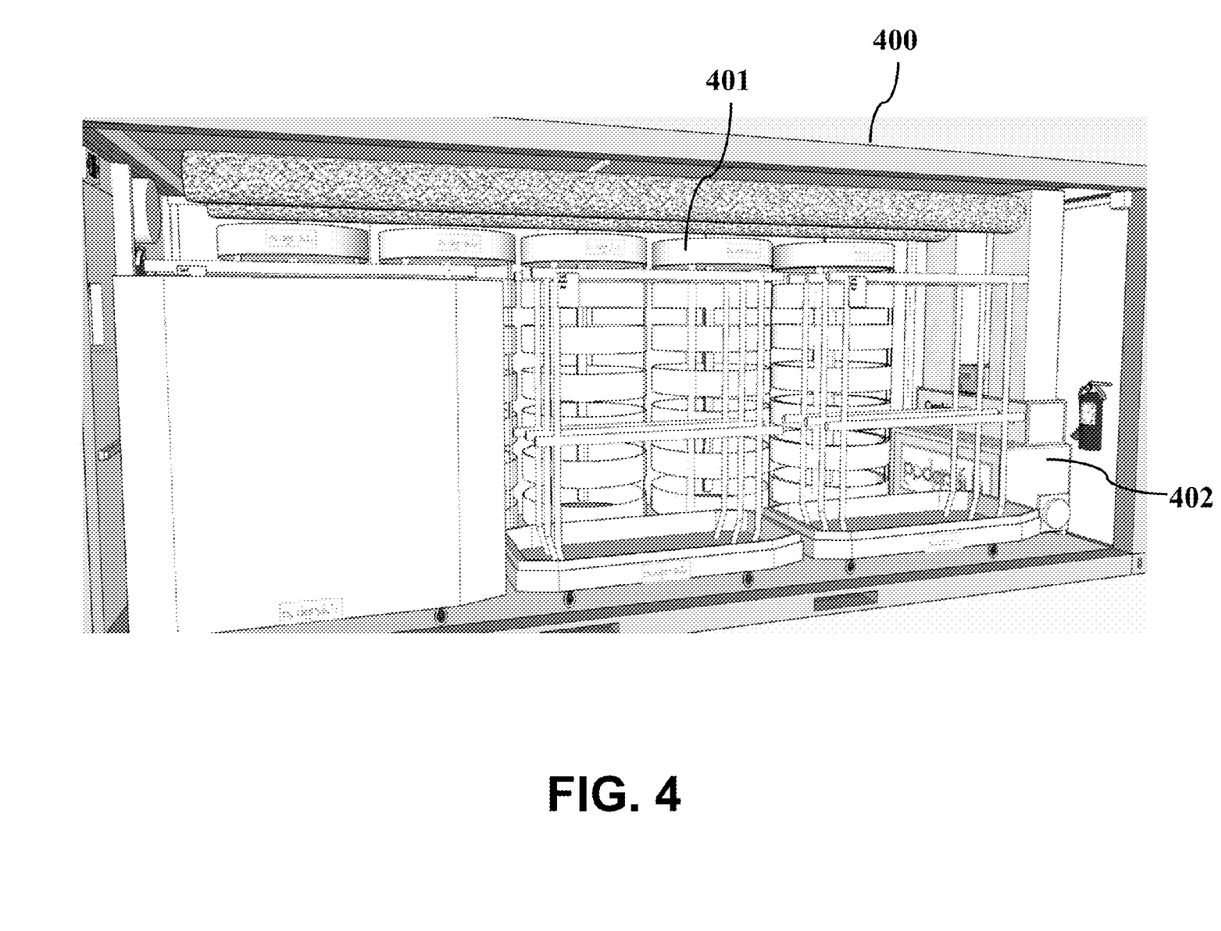
FIG. 4 is a cutaway perspective view of the interior of an embodiment enclosure serving as a drying pod.

FIG. 4 depicts a side view of drying pod 400. Generally, embodiment drying pods will have similar security and environmental conditioning and control components as the other pods previously discussed. Specifically, the air intake and outlet are controlled by an environmental control system that maintains consistent favorable conditions within the enclosure. Additionally, drying pod 400 has rotating product hangers 401. A product hanger may have several plants hung within it which are slowly rotated so that the various plants are subject to substantially similar environmental conditions over the course of processing. This can, for instance, prevent mold from forming if damp plants were to lie at the bottom of a stack of plants waiting to be processed. Drying machine 402 allows for controlled and consistent drying. Many different drying machines may be suitable for use depending on the product being processed.

Figure 5:
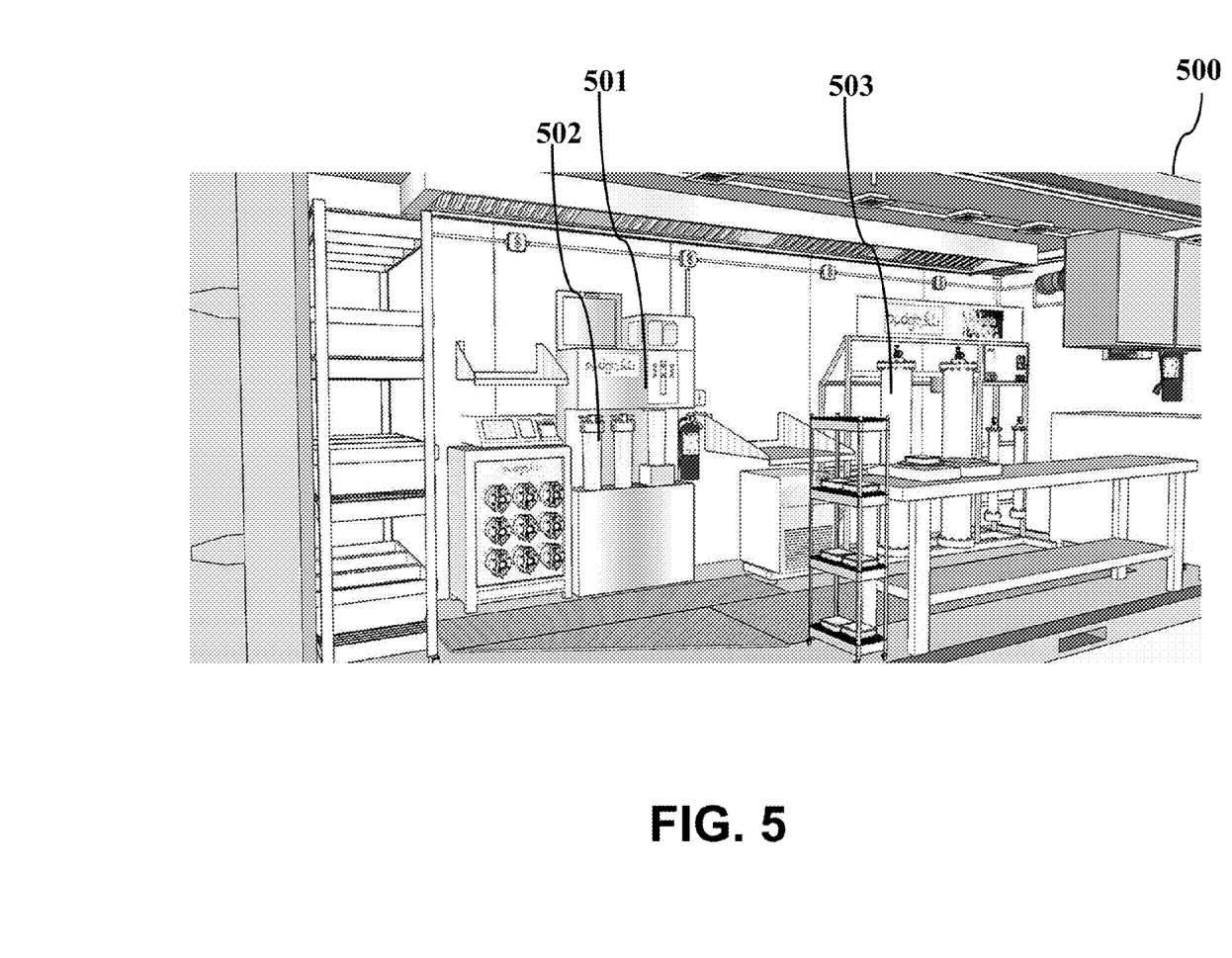
FIG. 5 is a cutaway perspective view of the interior of an embodiment enclosure serving as a extraction pod.

FIG. 5 depicts a side view of extraction pod 500, which provides an area where plant precursor may be processed into a final product suitable for sale or consumption. Grinding machine 501 is configured to operate with product containers 502, each of which contain an amount of dried plant material. The use of product containers allows plant material to be quickly and efficiently ground in preparation for final plant product extraction. Preferably, the final plant product is plant shatter. In the embodiment, extraction machine 503 is a commercially available apparatus for forming marijuana shatter from marijuana plant material. Various techniques for producing shatter are known to those of skill in the art to which the present disclosure pertains. For example and without limitation, employable shatter-production techniques include the use of hydrocarbons such as butane, propane and hexane and the use of water or carbon dioxide. In certain embodiments, other types of final plant product may be produced by various means as desired.

Environmental control systems may also include a humidity control unit or dehumidifier. An exemplary dehumidifier found to be effective is the 105 Dual Dehumidifier manufactured by QUEST of Madison, Wis. Control of humidity conditions can help deter or prevent the growth of destructive molds, Botrytis Cinerea and other bacteria.

In certain embodiments, modified shipping containers can be used as enclosures. Enclosures generally may take many sizes and shapes. Particular embodiments have been 20 and 40 feet in length, while being 8 feet wide and 7 feet, 9 inches tall. Insulated walls sandwiched by 2-20 gauge steel were found to generally provide adequate security. Joints in the enclosure may include a rubberized gasket seal between the ceiling and floor to ensure more effective encapsulation. Control units for use in embodiments may adhere to certain standards developed by parties other than the manufacturer or user, such as the NEMA 3R rating scheme.

Various lighting systems may be employed in embodiment systems. Preferably, a LED lighting system is employed. Such a system presents several advantages over alternative systems, including significant savings in power consumption that can add to the financial viability of a growing operation, and also reduce or eliminate the need to vent lighting-related heat from an enclosure. Alternatively, high pressure sodium lighting may be employed. In such a case, additional supporting hardware, such as a filter for cooling the lighting, and power ballasts, may be employed. The control unit of an embodiment may allow adjustment of the height and spectrum of the lighting system.

Figure 6:
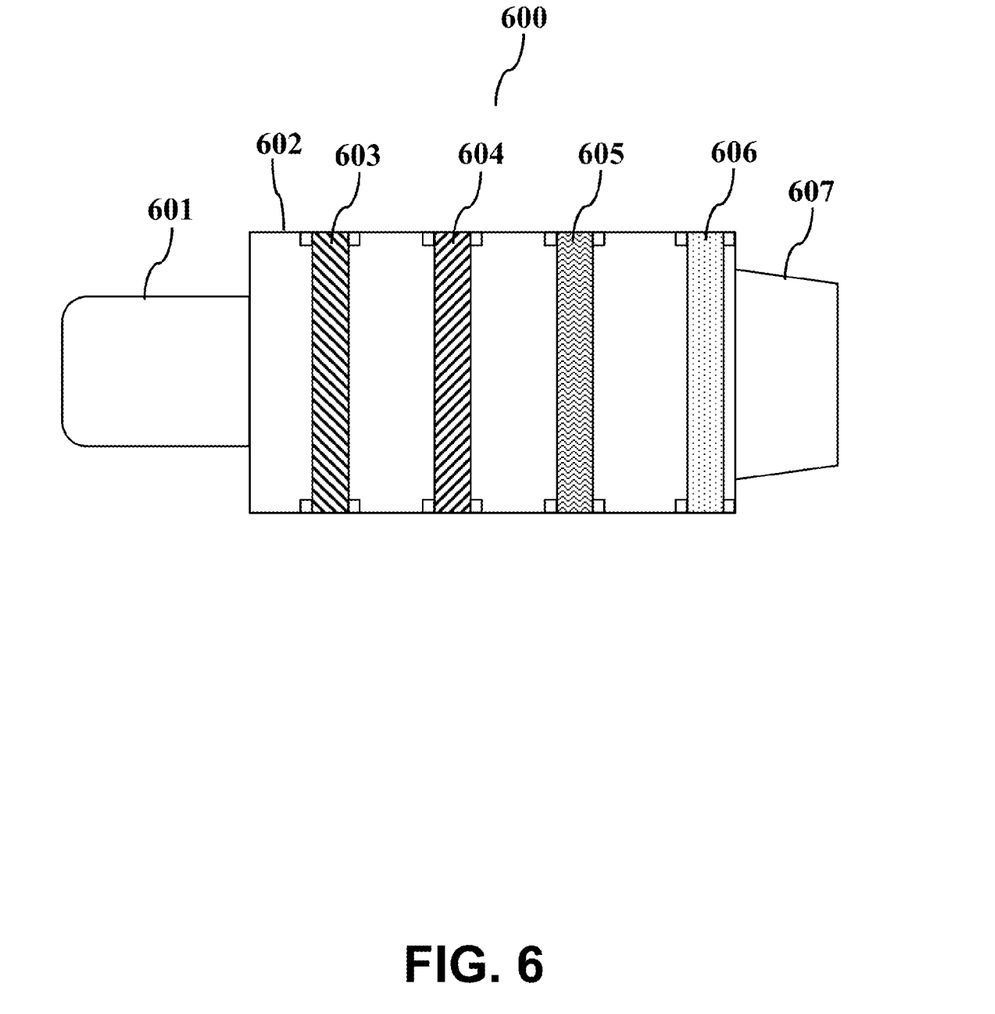
FIG. 6 is a side schematic diagram of the interior of an air filtration system.

FIG. 6 depicts a cutaway schematic view of an exemplary air filtration system 600. Air inlet 601 is configured to receive air from the exterior environment. Air filter body 602 contains filter elements 603, 604, 605, and 606, which are configured to provide a three stage filter for an enclosure pod. Preferably, each of the filter elements serves a different filtering function. Air duct 607 passes filtered air to the interior at the enclosure. Those of skill in the art to which the present disclosure pertains will understand that airflow can be maintained through air filtration system 600 by any suitable means, such as a fan. In the embodiment, air filtration system 600 is effective to regulate various environmental contaminants, such as dust, mold, pollen, insects and chemical pollutants. In a demonstrated embodiment, a filter unit contains a pre-filter, an antibacterial filter, a carbon zeolite filter and an activated carbon filter.

Certain preferred embodiments include a security monitoring system. Such a system may optionally employ a wide number of security technologies that will be readily apparent to those of skill in the art to which the present disclosure pertains, including door locks and sensors, motion sensors, video cameras, etc. Preferably, the security system maintains a record of instances of entrance to and movement within the enclosure during ongoing operations. Thus, access to the plants within the enclosure may be strictly controlled, to prevent theft or other illicit activity. Functionality may include forbidding off-hour access. The positioning of the control unit outside of the secured enclosure provides the significant benefit that only essential physical activity by persons is necessary within the enclosure during operations. Many aspects of ongoing operations, such as control of environmental conditions, can be controlled from the enclosure's exterior, significantly reducing the chance of improper employee conduct. In certain embodiments, the security system may be remotely monitored, for instance via a mobile device such as a cellular phone, so that physical proximity to the enclosure is not required. Thus, management or security staff may concentrate on other tasks. In addition to security functions, cameras placed inside the enclosure may deter theft and aid in investigations into wrong doing.

Another advantage of the disclosed system is that its configuration is particularly suitable for rapid scaling of operations. In certain demonstrated embodiments, the enclosure can be transported without substantial disassembly, for instance, without removing certain components of the system, such as extraction or drying equipment. Thus, pods may be moved to a growing location and rapidly deployed, in certain instances in a matter of minutes. Operations can therefore be rapidly scaled and begin producing product nearly immediately.

Continuous maintenance of optimum environmental conditions promotes plant yield and quality. Thus, because the disclosed system accomplishes continuous and, in some embodiments, totally autonomous control over environmental conditions, optimized yields and quantities are made possible.

Figure 7:
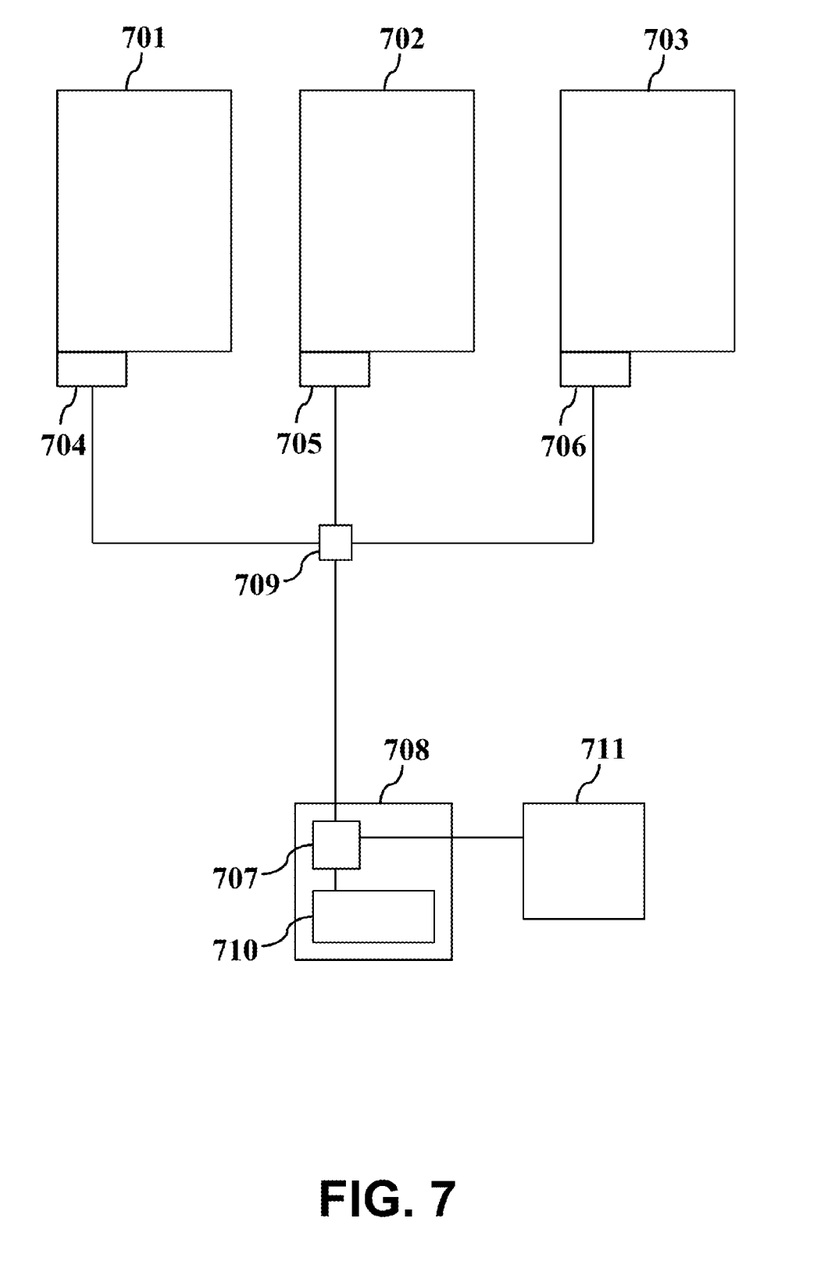
FIG. 7 is a schematic diagram of a setup of remotely managed pods.

FIG. 7 depicts a schematic diagram of an exemplary setup of multiple pods. Pods 701, 702 and 703 each have a respective control unit, here 704, 705 and 706. Control units 704, 705 and 706 each communicate with processor 707 of computer 708 through intermediary node 709, that could be, for instance, an Internet router. Alternatively, control units 704, 705 and 706 could communicate directly with computer 708. Processor of 707 can cause to be encoded on digital storage medium 710 information regarding the operation of pods 701, 702 and 703. For instance, access information about the pods could be recorded to provide a security log of individuals accessing the pods. Digital storage medium 710 may be any suitable medium, such as a disk hard drive or solid state hard drive. In the embodiment, processor 707 causes to be presented on display 711 information about the operation of the pods. In the embodiment, computer 708 and display 711 are remote from pods 701, 702 and 703, so that a user can operate and manage the pods from a remote location. Any desired number of pods or configurations could be employed as desired or needed. For instance, pods could be stacked or aligned in rows.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A securable enclosure for growing controlled plants, comprising:
    a plurality of walls forming an environmentally isolated interior of said enclosure;
    a securable entrance configured to deter unauthorized access to said interior and having a secured condition and a unsecured condition;
    an environmental control system configured to regulate a set of environmental conditions within said interior so as to control a level of at least one of dust, mold, pollen, insects and chemical pollutants within said interior;
    wherein the environmental control system includes an air filtration system including a two stage filter or a three stage filter;
    a control unit disposed on an exterior surface of one of the walls that is configured to allow control of said environmental conditions within the enclosure while the securable entrance is maintained in a secured condition; and
    at least one cylindrical product retention rack, configured to rotate about a vertical axis, and at least one drying machine together configured to allow effective controlled drying of plant material.

2. The enclosure of claim 1, further comprising at least one table positioned within said enclosure and configured to receive a plurality of nursery-stage plants; and
    a lighting system effective to supply said nursery-stage plants with light.

3. The enclosure of claim 1, further comprising at least one shelf positioned within said enclosure and configured to receive a plurality of flowering-stage plants; and a lighting system effective to supply said flowering-stage plants with light.

4. The enclosure of claim 3 wherein the environmental control system includes an air filtration system including a two stage filter or a three stage filter.

5. The enclosure of claim 1, further comprising a grinding machine and a product-extraction machine that are together effective to produce final plant product.

* * * * *